United States Patent [19]

Lurie

[11] Patent Number: 4,912,386
[45] Date of Patent: Mar. 27, 1990

[54] BALANCED BRIDGE FEEDBACK CONTROL SYSTEM

[75] Inventor: Boris J. Lurie, La Crescenta, Calif.

[73] Assignee: The United States of America as represented by the Administrator of the National Aeronautics and Space Administration, Washington, D.C.

[21] Appl. No.: 332,677

[22] Filed: Mar. 21, 1989

[51] Int. Cl.⁴ .......................... H02P 5/16; G05B 5/01
[52] U.S. Cl. .................................. 318/615; 318/434;
318/561; 318/618; 388/821
[58] Field of Search .................. 318/430–434,
318/594–638

[56] References Cited

U.S. PATENT DOCUMENTS

| | | | |
|---|---|---|---|
| 3,617,844 | 11/1971 | Grygera | 388/821 |
| 3,633,086 | 1/1972 | Speth | 318/561 X |
| 4,028,601 | 6/1977 | Peterson | 318/430 X |
| 4,030,132 | 6/1977 | Iftikar et al. | |
| 4,284,942 | 8/1981 | Bigley et al. | 318/618 |
| 4,295,081 | 10/1981 | Bigley, Jr. et al. | |
| 4,322,668 | 3/1982 | Trussler et al. | 318/432 X |
| 4,337,427 | 6/1982 | Maudal | |
| 4,341,986 | 7/1982 | Browder | |
| 4,345,294 | 9/1982 | Green | |
| 4,535,277 | 8/1985 | Kurakake | |
| 4,556,830 | 12/1985 | Schwaim et al. | 318/434 X |
| 4,574,227 | 3/1986 | Herder et al. | 318/594 |
| 4,639,854 | 1/1987 | Kurokawa et al. | |
| 4,659,976 | 4/1987 | Johanson | 318/434 X |
| 4,748,555 | 5/1988 | Miyake et al. | 318/632 X |
| 4,814,678 | 3/1989 | Omae et al. | 318/434 X |
| 4,816,734 | 3/1989 | Kurakake et al. | 318/615 |

Primary Examiner—William M. Shoop, Jr.
Assistant Examiner—Paul Ip
Attorney, Agent, or Firm—Thomas H. Jones; John R. Manning; Charles E. B. Glenn

[57] ABSTRACT

In a system having a driver, a motor, and a mechanical plant, a multiloop feedback control apparatus for controlling the movement and/or positioning of a mechanical plant, the control apparatus having a first local bridge feedback loop for feeding back a signal representative of a selected ratio of voltage and current at the output of the driver, and a second bridge feedback loop for feeding back a signal representative of a selected ratio of force and velocity at the output of the motor. The control apparatus may further include an outer loop for feeding back a signal representing the angular velocity and/or position of the mechanical plant.

15 Claims, 6 Drawing Sheets

BALANCED BRIDGE FEEDBACK CONTROL SYSTEM

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates generally to pointing control systems, and more particularly, to multiloop pointing control systems employing balanced bridge feedback techniques.

BACKGROUND ART

The typical system to which the subject invention is directed is a rotational pointing control system comprised of a driver, a motor, and a mechanical plant. Specific examples would include control systems used for the precision pointing and movement of telescopes or scanning antennas.

In a typical satellite application, a motor and a plant to be driven are located at the far end of a flexible boom attached to a spacecraft. The motor which drives the platform has several intrinsic characteristics which make it very difficult to rotate the platform with constant acceleration. Such undesirable motor characteristics include internal friction, vibration, hysteresis caused by the frictional forces associated with ball bearings, and oscillations about the motor's shaft caused by a finite number of magnetic poles. Other components contribute to the problem with their own resonant disturbances because the motor is flexibly connected to the plant on one side, to the boom on the other side, the boom itself is flexible, and the other end of the boom is attached to a moving spacecraft.

Closed loop feedback systems are invariably employed in rotational pointing systems in order to accurately control movement and position because such a feedback system provides a means whereby any disturbance from a desired velocity or position may be sensed and corrected. In addition, closed loop feedback systems allow the control system to be designed without requiring that the engineer account for all of the minute characteristics of the specific plant to be driven.

While feedback control systems have been employed in the prior art to reduce the effect of disturbances, such standard feedback systems have never provided more than several microradians of accuracy when used with standard motors. The prior art feedback control systems are only capable of achieving sub-microradian pointing and moving accuracy when used with expensive magnetic suspension motors that do not exhibit many of the inherent disturbances associated with standard motors. However, using the prior feedback techniques with magnetic suspension motors is an undesirable solution for improving accuracy because magnetic motors are expensive and consume large amounts of power.

Although multiloop feedback systems have been employed in pointing control systems, such prior art control systems typically employ a common feedback loop around the entire system and only current feedback around the motor. The common feedback loop reduces the effects of variations in the mechanical plant parameters and of motor and gear train friction and cogging. However, the achievable loop gain in the common loop is limited by inherent disturbances associated with a flexible plant and high frequency sensor noise. These limitations are such that the achievable loop gain in the common loop is frequently insufficient to reduce the effects of motor friction and cogging.

Another type of feedback known in communication engineering is bridge feedback. In communication engineering, bridge feedback refers generally to the concept of feeding back both current and voltage in a feedback amplifier stage. Both single and double loop feedback systems are known to date in the communication field. However, double loop bridge feedback has not been applied to the problem of mechanical control systems.

STATEMENT OF THE INVENTION

It is therefore an object of the present invention to improve pointing or positional control systems;

It is another object of the present invention to provide a pointing control system which employs multiloop balanced bridge feedback;

It is another object of the present invention to provide a pointing or positional control system having a multiloop bridge feedback control system where the outer bridge feedback loop around the actuator is decoupled from the variable load of the mechanical plant thereby allowing mechanical plant and sensor disturbances to be reduced with the more predictable feedback characteristics of the actuator feedback loop (where "actuator" is taken to include both the driver and the motor);

It is another object of the present invention to provide a pointing or positional control system having a multiloop feedback control system wherein the loop gain and feedback bandwidth may be increased relative to conventional feedback system, thereby eliminating the need for expensive magnetic suspension motors in precision pointing or positional control systems.

Accordingly, as discussed in more detail further herein with respect to a rotational pointing control system, balanced bridge feedback may be employed in order to achieve all of the aforementioned objects. The present invention provides a first local bridge feedback loop around the driver (electrical amplifier) for feeding back a selected ratio of voltage and current signals, and a second local bridge feedback loop around the actuator for feeding back a selected ratio of force and velocity signals. The present invention may further include a common or outer loop for feedback of the angular velocity ($d\theta/dt = \dot{\theta}$) of a driven mechanical plant.

BRIEF DESCRIPTION OF THE DRAWINGS

The just-summarized invention will now be described in detail in conjunction with the drawings of which.

DETAILED DESCRIPTION OF THE INVENTION

Figure 1:
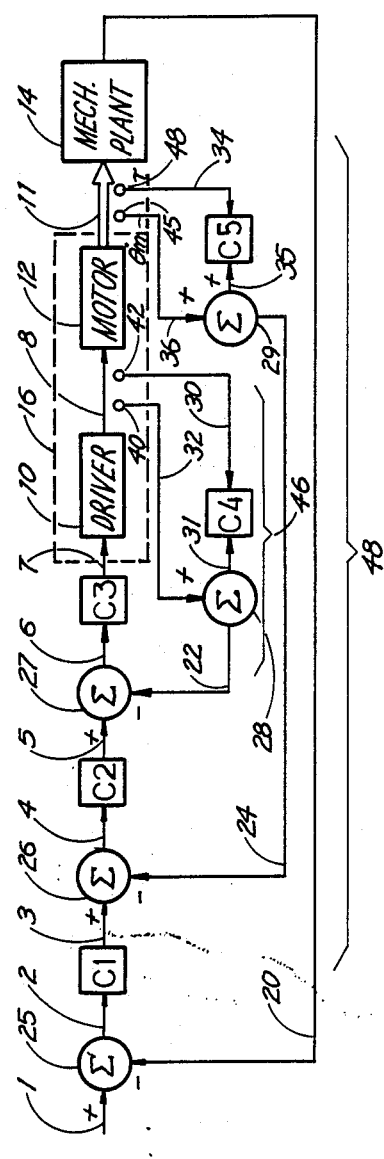
FIG. 1 is a block diagram of a three loop balanced bridge feedback pointing control system.

The system depicted by FIG. 1 illustrates a preferred embodiment of the present invention as employed in a rotational pointing control system which includes a driver/amplifier 10, a motor 12, and a mechanical plant 14.

The system of FIG. 1 includes a control signal 1 which is provided to a positive input of a summer 25, an output of summer 25 then being provided to a compensator C1 through a line 2. The output of the compensator C1 is provided to a positive input of a summer 26 through a line 3, an output of summer 26 is provided to a compensator C2 through a line 4, and an output of compensator C2 is then provided to a positive input of a summer 27 through a line 5. Next, an output of the summer 27 is provided as an input to the driver 10 through a compensator C3 and lines 6 and 7 and an output of the driver 10 is provided to an input of the motor 12 through a line 8. A voltage sensed by a voltage sensor 40 at the line 8 is provided to a first positive input of a summer 28 through a line 32 and current sensed by a current sensor 42 at the line 8 is provided to a second positive input of the summer 28 through a compensator C4 and lines 30 and 31. A feedback signal is provided to a negative input of the summer 27 by an output line 22 at an output of the summer 28. The output of the motor 12 is connected to the mechanical plant 14 through a mechanical link 11. A torque sensor 48 and an angular velocity sensor 45, located at the mechanical link 11, provide positive inputs to a summer 29 through a compensator C5 and lines 34 and 35 and through a line 36, respectively. An output of the summer 29 is provided as a feedback signal to a negative input of the summer 26 through a line 24. Finally, a common feedback control line 20 from the mechanical plant 14 is provided as a feedback signal to a negative input of the summer 25.

The three feedback loops present in FIG. 1 include the common or outer feedback loop 20 around the entire system for feeding back information concerning the angular velocity $\dot{\theta}$ of the mechanical plant 14, a first bridge feedback loop 46 around the driver 10, and a second bridge feedback loop 48 around an actuator 16 where the actuator is defined to comprise the driver 10 and the motor 12. The first local bridge feedback loop 46 includes the voltage sensor 40, the current sensor 42, the compensator C4, the summer 28, and lines 30, 31, 32 and 22. The second local bridge feedback loop 48 includes the torque sensor 48, the angular velocity sensor 45, the compensator C5, the summer 29, and lines 34, 35, 36, and 24. The five compensators C1, C2, C3, C4, C5 are provided in order to achieve a desired loop transfer function for each of the feedback loops and for controlling the ratio of the bridge feedback signal pairs as described further herein.

Referring to FIG. 1, the stator and rotor of the motor 12 are rigidly connected to the mechanical plant 14. The mechanical plant 14 is not necessarily rigid and may be flexible. The first bridge feedback loop 46 feeds back information about current (I) and voltage (V) measured by collocated sensors 40,42 placed between the output of the driver 10 and the input to the motor 12.

In rotational systems, the angular velocity to torque ratio is equivalent to electrical impedance where torque is taken to be analogous to electrical current and angular velocity is taken to be analogous to electrical voltage. Consequently, bridge feedback in a rotational system must employ collocated sensors of torque and relative angular velocity at the mechanical junctions as shown in FIG. 1. The second bridge feedback loop 48 feeds back information about Torque $\tau$ and relative angular velocity $\dot{\theta}_m$ measured by collocated sensors 45,48 located at the junction 11 between the motor 12 and the mechanical plant 14.

Figure 2:
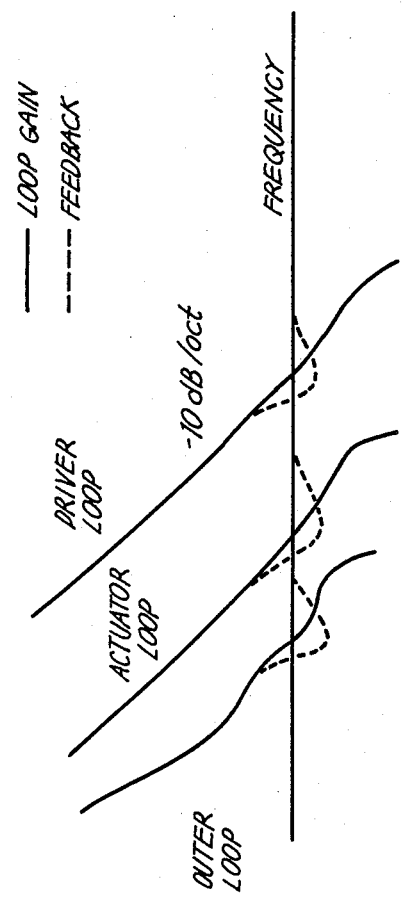
FIG. 2 is a Bode diagram of the loop transfer functions of the driver, actuator, and common feedback loops.

FIG. 2 is a conventional Bode diagram of the loop responses or return ratios of the outer loop T, the motor loop, and the actuator loop.

The ratios of the bridge feedback signal pairs are controlled by linear compensator links C4 and C5 for the first local bridge feedback loop 46 and the second local bridge feedback loop 48, respectively. As previously discussed, the other compensators C1, C2 and C3 in FIG. 3 are included to allow the designer to implement a desired loop response suitable for average values of the plant parameters.

The design of a feedback network for use in a pointing control system is greatly simplified by the use of balanced bridge feedback. By using the balanced bridge feedback techniques of the present invention, the design problem is merely to select the transfer functions of compensators C1, C2, and C3 in order to obtain the desired loop response and to set the ratio of bridge feedback signal pairs based upon the transfer functions of the linear compensators C4,C5. As shown by FIG. 2, the regions of substantial positive feedback can be made not to overlap and the loop gain in the actuator loop can be made large so that the actuator closed loop transfer function is nearly equal to the inverse of its feedback path transfer function. Although these two factors greatly simplify the design, the three loops are still generally coupled, and their interaction still operates as a limitation on the achievable feedback in each of the loops.

Figure 3:
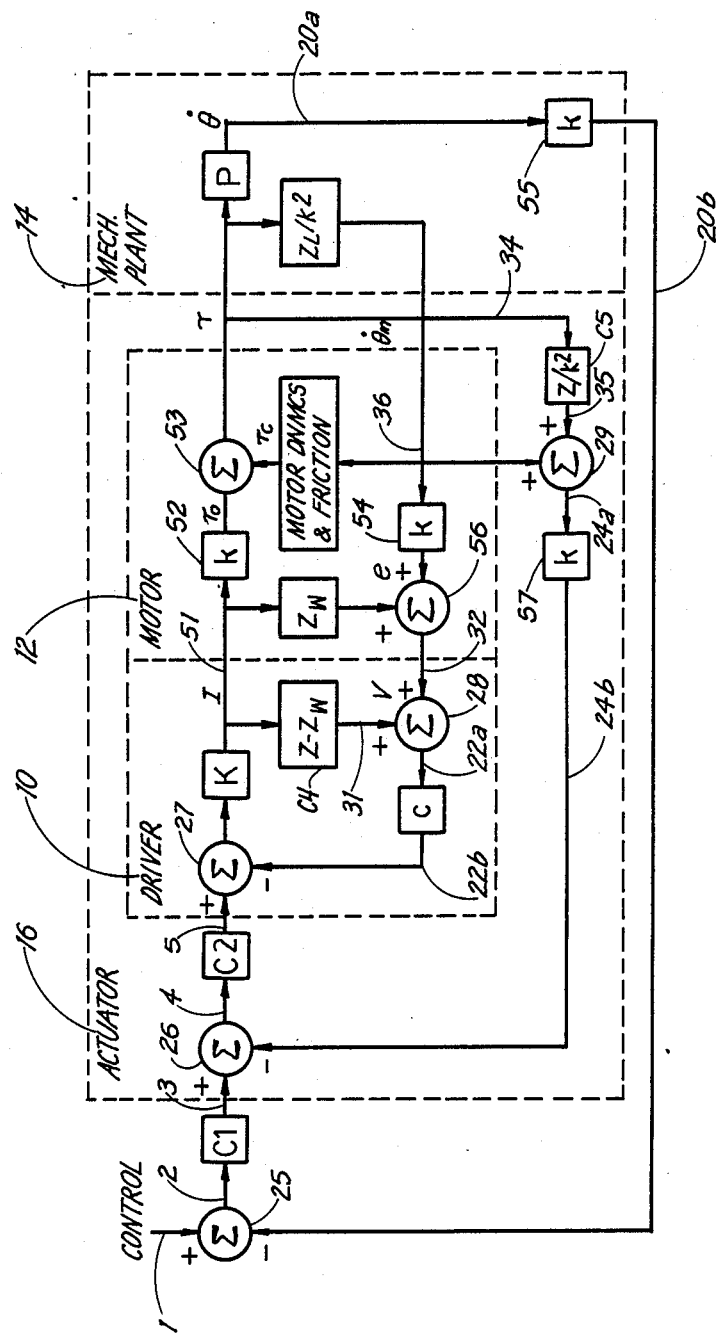
FIG. 3 is a flow-graph of a three loop balanced bridge rotational control system.

FIG. 3 expands on the conceptual diagram of FIG. 1 and illustrates the preferred embodiment of the present invention in a signal flow diagram for a three loop balanced bridge rotational control system. Link K represents the combined transfer function of a real amplifier and that of compensator C3.

The flow diagram of FIG. 3 includes a control signal 1 which is provided to a positive input of a summer 25, the output of summer 25 then being supplied to a positive input of a summer 26 through a compensator C1 and lines 2 and 3. The output of the summer 26 is then provided to a positive input of a summer 27 through a compensator C2 and lines 4 and 5. Next, the output of the summer 27 is provided to a link K which corresponds to the transconductance of the driver 10 and the transfer function of the link C3. The output of the link K produces a current output signal I which is provided to drive the motor 12 and is also fed back to a negative input of the summer 27 through a compensator C4, a line 31, a first positive input of a summer 28, a feedback link c and lines 22a and 22b. The voltage generated across the impedance $Z_w$ of the motor windings by the output signal I and the back electromotive force of the motor e are combined by summer 56 and fed back to a negative input of the summer 27 through a second positive input of the summer 28, the feedback link c and the lines 22a and 22b. The link 52 represents a motor constant k used for conversion between the electrical and mechanical parameters of the feedback system. The output signal I produces a nominal torque $\tau_o = kI$ at the output of link 52 (k) of the motor 12. The actual output torque $\tau$ available at the output of motor 12 is comprised of nominal torque $\tau_o$ and the torque $\tau_c$ due to motor dynamics and friction as shown by summer 53 in FIG. 3. The actual torque $\tau$ output by summer 53 is then provided to the mechanical plant 14 having a transfer function P and the output of the mechanical plant transfer function P is fed back to the negative input of a summer 25 through a link 57 and lines 24a and 25b.

For purposes of discussion, the actuator 16, comprised of the driver 10 and the motor 12, is considered to be a subsystem and the driver 10 is considered to be a further subsystem of the actuator 16. The sensors are considered ideal. The torque $\tau$ is applied to an uncertain mechanical plant 14 which is to be controlled.

Figure 4:
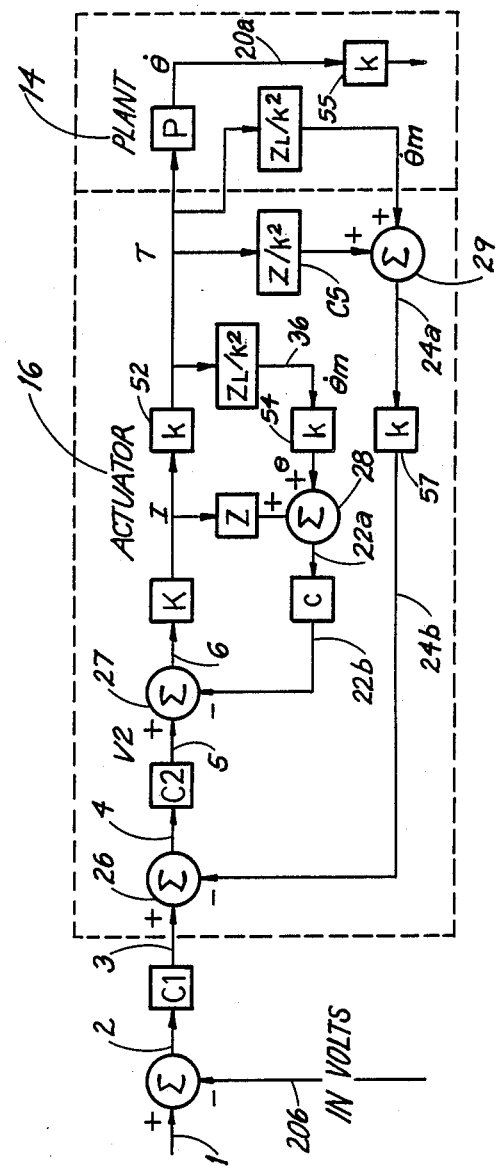
FIG. 4 is a simplified flow-graph of the three loop balanced bridge rotational control system depicted in FIG. 3.

In order to simplify analysis, the constant k is provided in order to allow electromagnetic rotor-stator interaction to be seen as producing a torque $\tau_o = kI$. Thus, the constant k may be used for conversion between the electrical and mechanical parameters of the system such that an angular velocity/torque ratio (i.e. a mechanical impedance) can be represented at a voltage/current ratio divided by $k^2$. In FIGS. 3 and 4, the links 52, 54, 55, and 57 are all depicted as having a transfer function k. It is readily understood that the actual transfer function of the links 52, 52, 55, and 57 could be different from one another. The torque $\tau_c$ represents motor and gear-train dynamic disturbances such as cogging and friction.

$Z_L/k^2$ is the driving point function and P is the transfer function of the mechanical plant in the directions indicated in FIG. 3. $Z_L/k^2$ may be thought of as a driving point mechanical impedance which loads the motor and $Z_L$ as analogous to the electrical driving point impedance corresponding to an equivalent ratio of voltage to current at the same pair of terminals.

The voltage at the input the motor is the sum of the back electromotive force $e = (Z_L/k^2)k\dot{\theta}_m$ and the voltage drop across the motor's winding impedance $Z_w$. The constant transfer coefficient of feedback link c in the feedback path 22a and 22b of the driver 10 should be small in order for the driver 10 to provide sufficient voltage gain.

As shown in FIG. 3, the transfer functions of the linear compensators C4 and C5 are defined as $Z-Z_w$ and $Z/k^2$, respectively. As discussed earlier, the transmission functions of linear compensators C4 and C5 are specified by the designer in order to set the desired ratio of bridge feedback signals. As further shown by FIG. 3, the interaction between the transfer function of the compensator C4 ($Z-Z_w$) and the transfer function of the motor winding impedance ($Z_w$) provide a resultant transmission function that is independent of the effects of the motor winding impedance $Z_w$.

FIG. 4 is a simplified flow-graph of the system depicted in FIG. 3 wherein the motor winding impedance $Z_w$ and the torque component $\tau_c$ related to the motor dynamics have been omitted such that the actual torque is assumed to equal the nominal torque produced by the motor 12 (i.e. $\tau = \tau_o$). In addition, the contribution of the back electromotive force $e = (Z_L/k^2)K\dot{\theta}_m$ to the driver loop feedback and to the actuator loop is shown separately. Finally, the common loop is shown to be open.

Referring to FIG. 4, the transfer function around the actuator loop (measured when the loop is broken at the input of compensator C2) is the product of compensator transfer function C2, the transfer function of the driver, and the transfer function of the feedback path $(Z + Z_L)/k$:

$$C2 \times \frac{Kk}{1 + K(Z + Z_L)c} \times \frac{(Z + Z_L)}{k} \qquad (1)$$

If the gain K of the driver is very large, the equation simplifies to:

$$C2 \times \frac{k}{(Z + Z_L)c} \times \frac{(Z + Z_L)}{k} = \frac{C2}{c} \qquad (2)$$

Thus, the loop transfer function (return ratio) of the actuator loop is simply C2/c and is independent of $Z_L$ and Z, a property of balanced bridge feedback. The ability of the present invention to provide an actuator loop transfer function that is independent of $Z_L$ and Z allows the feedback of the actuator loop and the bandwidth of the actuator's transfer function to be substantially increased without causing instability.

In implementing the present invention, the recommended sequence is to design the outer loop first, then the driver loop, and finally the actuator loop.

OUTER LOOP: Assuming the magnitude of the transfer function of compensator C2 is very large, the actuator closed loop transfer function is merely the inverse of its feedback path as shown in FIG. 4:

$$\frac{1}{(Z_L + Z)/k} = \frac{k}{(Z_L + Z)} \qquad (3)$$

The loop transfer function or return ratio for the outer loop (measured with the loop broken at the input of compensator C1) is the product of compensator transfer function C1, the closed loop transfer function of the actuator (equation 3), the mechanical plant transfer function P, and constant k:

$$C1 \times \frac{k}{(Z_L + Z)} \times P \times k = C1 \frac{Pk^2}{(Z_L + Z)} \qquad (4)$$

It can also be seen from FIG. 4 that $$\dot{\theta}_m = Z_L/k^2 \times \tau \qquad (5) \text{ and}$$

$$\dot{\theta} = \tau P \qquad (6) \text{ such that}$$

$$\dot{\tau}/\dot{\tau}_m = Pk^2/Z_L. \qquad (7)$$

The overall performance of the actuator system can be readily understood by analyzing the actuator in terms of the brake torque and the free run angular velocity. Recall that $$\tau_o = kI \qquad (8) \text{ and}$$

$$Z_L = \dot{\theta}/\tau \qquad (9)$$

In the particular case of an infinite load (which brakes the motor), $\theta_m = 0$, implying that $Z_L = 0$. Under an infinite load, the torque which is generally defined as $$\tau_o = kI = kV/[(Z_L + Z)c] \qquad (10)$$

degenerates into the brake torque $$\tau_b = kV/[Zc] \quad (11)$$

Note that the general equation (9) for torque may be defined in terms of the brake torque as $$\tau = \frac{kV}{Zc} \times \frac{Z}{(Z_L + Z)} = \tau_b \times \frac{Z}{(Z_L + Z)} \quad (12)$$

In the particular case of zero load, $\tau=0$, implying that $Z_L=$infinity. Referring to FIG. 4, it can be seen that $\tau$ can be defined as a function of V2 as follows:

$$\tau = \frac{V2\,K\,k}{(1 - KZ - KZ_L)c} \quad (13)$$

and also that $$\dot{\theta}_m = \tau(Z_L/k^2) \quad (14)$$

Therefore, since $Z_L=$infinity under zero load conditions, the free run relative angular velocity is $$\dot{\theta}_{mf} = V2/kc \quad (15)$$

and from equations (11) and (15)

$$\dot{\theta}_{mf}/\tau_b = Z/K^2 \quad (16)$$

The relative angular velocity of the motor can therefore be expressed in terms of the brake torque as $$\dot{\theta}_m = \tau \frac{Z_L}{k^2} = \tau_b \frac{Z}{Z + Z_L} \frac{Z_L}{K^2} \quad (17)$$

The relative angular velocity may alternatively be expressed in terms of the free run relative angular velocity as $$\dot{\theta}_m = \dot{\theta}_{mf} \frac{Z_L}{Z + Z_L} \quad (18)$$

Therefore, from equations (12) and (17)

$$\tau = \tau_b - (k^2/Z)\dot{\theta}_m \quad (19)$$

Figure 5:
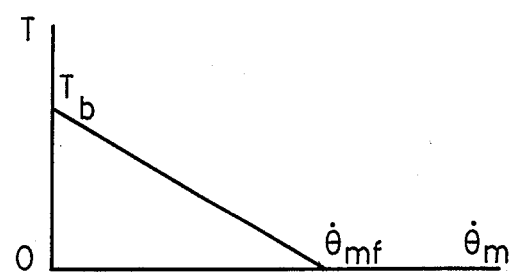
FIG. 5 is a graph of the torque output of the actuator as a function of relative angular velocity.

If $Z=r$, where r is a real number, the torque-angular velocity characteristic of the actuator is a straight line as shown in FIG. 5. Thus, as clear from FIG. 5 and equation (19), the performance of the actuator system is largely a function of Z.

Figure 6A:
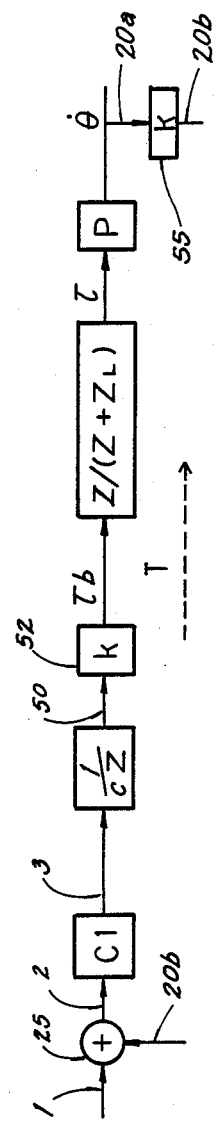
FIG. 6a is a flow-graph for the common feedback loop where the plant is analyzed as being driven by torque $\tau$.
Figure 6B:
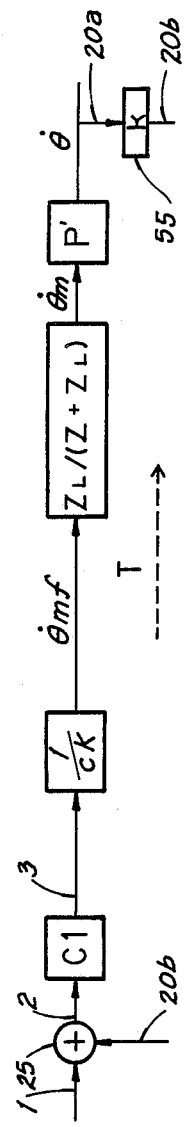
FIG. 6b is a flow-graph for the common feedback loop where the plant is analyzed as being driven by relative angular velocity $\dot{\theta}_m$.

Using the above formulas, conceptual flow graphs for the outer loop may be derived as illustrated in FIGS. 6a and 6b. FIG. 6a represents the flow graph for the outer loop if analyzed as being driven by torque $\tau$ and FIG. 6b represents the flow graph for the outer loop if analyzed as being driven by relative angular velocity $\dot{\theta}$m. The link k converts the angular velocity into voltage and the transfer function of a real sensor closes each loop. In the case of position control, the plant contains an extra integrator to derive angular position from angular velocity.

In FIG. 6a, an input signal 1 is provided to a summer 25 and the output of summer 25 is provided as an input to compensator C1. The output of C1 is provided to link 1/cZ by a line 3 and the output of link 1/cZ is provided to a link k by a line 50 which produces an output equal to the brake torque $\tau_b$ derived above in equation (11).

The brake torque $\tau_b$ is provided to link $Z/(Z+Z_L)$ to produce the torque $\tau$ which drives the plant with transfer function P at an angular velocity $\dot{\theta}$. The plant's angular velocity is provided to link k, the output of which may be fed back to an input of the summer 25 through a real angular velocity sensor (not shown).

In FIG. 6b, an input signal 1 is provided to a summer 25 and the output of the summer 25 is provided as an input to compensator C1. The output of the compensator C1 is provided to a link 1/ck by a line 3 and the output of the link 1/ck produces free run angular velocity $\dot{\theta}_{mf}$ in accordance with equation (15). The free run angular velocity $\dot{\theta}_{mf}$ is then provided to a link $Z_L/(Z+Z_L)$ in order to produce the angular velocity $\dot{\theta}_m$ which drives the plant with transfer function P' where P'=P $(k^2/Z_L)$. The plant's angular velocity $\dot{\theta}$ is provided to link k, the output of which may be fed back to an input of the summer 25 through a real angular velocity sensor (not shown).

Because of the balanced bridge feedback of the present invention, the task for the designer is merely to determine a function Z(s) (a scalar or a function of frequency) that minimizes the relative variations in the common loop return ratio To over the frequency region critical for system stability. For a plant with structural resonances, a good criterion is the minimization of the magnitude of sharp resonance deviations from the average gain around the loop.

Z(s) may be found analytically or by simulation. For instance, the designer may determine the optimal values of Z at a number of discrete frequencies. Then, a function Z(s) may be constructed which results in the desired value of Z in all critical frequency regions.

It must be stressed that an appropriately selected Z(s) must reduce the variations in the return ratio T which are due to plant uncertainty, not just shape the frequency response of T for average values of plant parameters. The shape of the frequency response of T may be corrected with the compensator C1. Notice that a properly chosen Z(s) can also reduce the effects of noise sources by damping certain resonant modes.

DRIVER LOOP: Once a function Z(s) has been determined, the difference between that function and the impedance $Z_w$ of the motor winding defines the desired transfer function of feedback link C4. The output electrical impedance of the driver (electrical amplifier) will then be $Z(s)-Z_w(s)$. Thus, after adding in series the motor winding impedance Zw, the equivalent source impedance at the actuator feedback loop is simply Z(s). Practical methods of amplifier design for achieving such a prescribed output impedance are discussed in B. J. Lurie, *Feedback Maximization*, Dedham, Ma: Artech House, 1986; H. W. Bode, *Network Analysis and Feedback Amplifiers, Design*, N.Y.: Van Nostrand, 1945, and B. J. Lurie, *Transistor Feedback Amplifiers*, Moscow: Svias, 1965 (in Russian).

ACTUATOR LOOP: As established earlier, the actuator loop return ratio is approximately C2/c. Therefore, the compensator transfer function C2 may exhibit a conventional type loop response (as shown in FIG. 2), where the feedback bandwidth is limited by the motor dynamics and the noise of the torque and angular velocity sensors. For more accurate analysis, C2 may be adjusted after disturbances and nonlinearities have been taken into account.

The present invention may also be utilized with equal benefit in a translational system. The foregoing description of a rotational pointing control system may be conceptually applied to a translational control system by simply substituting linear force and translational velocity for the corresponding torque and angular velocity terms.

It is therefore readily understood that many different varieties of motors can be employed with the balanced bridge feedback techniques of the present invention. For example, a piezo-electric actuator could be utilized where linear movement is desired. The temperature dependence and hysteresis imperfections of the piezo-electric transducer could be greatly reduced by using balanced bridge feedback.

As will be apparent to those skilled in the art, various modifications and adaptations of the preferred embodiment may be made without departing from the scope and spirit of the invention. It is therefore to be understood that, within the scope of the appended claims, the invention may be practiced other than as specifically described herein.

I claim:

1. A multiloop feedback control apparatus for achieving greater control accuracy having a driver outputting an electrical signal in response to an electrical control signal and a motor outputting a force and a velocity in response to the output of the driver comprising:
   a first bridge feedback loop means for feeding back and combining with the control signal a selected ratio of the current and voltage level at the output of the driver, and
   a second bridge feedback loop means for feeding back and combining with the control signal a selected ratio of the force and velocity output by the motor.

2. The feedback control apparatus of claim 1 further including a third feedback loop means for feeding back and combining with the control signal a signal representative of the velocity of a mechanical plant driven by the motor.

3. The feedback control apparatus of claim 1 wherein the output force of the motor is a torque force and the output velocity of the motor is an angular velocity.

4. The feedback control apparatus of claim 1 wherein the output force of the motor is a linear force and the output velocity of the motor is a translational velocity.

5. A multiloop balanced bridge feedback control apparatus for providing precision movement and/or pointing of a mechanical plant in response to a control signal, comprising:
   a first summing means having a command input, a feedback input and an output, the control signal being provided to the command input of the first summing means;
   a second summing means having a command input, a feedback input, and an output, the output of the first summing means being provided to the command input of the second summing means;
   amplifier means for providing an electrical driving signal exhibiting a voltage and a current in response to the output of the second summing means;
   a motor for providing a force output and a velocity output in response to the electrical driving signal, the output of the motor being operatively attached to the mechanical plant;
   means for sensing the voltage of the electrical driving signal and for providing a sensed voltage signal representative thereof;
   means for sensing the current of the electrical driving signal and for providing a sensed current signal representative thereof;
   a first bridge feedback means for feeding back a selected ratio of the sensed voltage signal and sensed current signal to the feedback input of the second summing means;
   means for sensing the output force of the motor and for providing a force signal representative thereof;
   means for sensing the output velocity of the motor and for providing a velocity signal representative thereof, and
   a second bridge feedback means for feeding back a selected ratio of the force and velocity signals to the feedback input of the first summing means.

6. The balanced bridge feedback control apparatus of claim 5 wherein the output force of the motor is a torque force and the output velocity of the motor is an angular velocity.

7. The balanced bridge feedback control apparatus of claim 5 wherein the output force of the motor is a linear force and the output velocity of the motor is a translational velocity.

8. The balanced bridge feedback control apparatus of claim 5 further comprising:
   third summing means having a command input, a feedback input, and an output, the control signal being provided to the command input of the third summing means and the output of the third summing means being provided to the command input of the first summing means;
   means for sensing the velocity of the mechanical plant and for providing a plant velocity signal representative thereof, and
   a common feedback means for feeding back the plant velocity signal to the feedback input of the third summing means.

9. The balanced bridge feedback control apparatus of claim 8 further comprising means for integrating the plant velocity signal for providing a signal representative of the position of the mechanical plant.

10. The balanced bridge feedback control system of claim 5 wherein the ratio of sensed voltage and current signals fed back by the first bridge feedback means is selected by providing the sensed voltage signal or the sensed current signal to a compensator before the signals are combined and fed back, the transfer function of the compensator selected in order to achieve the selected ratio.

11. The balanced bridge feedback control system of claim 5 wherein the ratio of force and velocity signals fed back by the second bridge feedback means if selected by providing the force signal or the velocity signal to a compensator before the signals are combined and fed back, the transfer function of the compensator selected in order to achieve the selected ratio.

12. A method of controlling the moving and holding of a mechanical plant comprising the steps of:
   generating a control signal;
   generating an electrical motor drive signal which is supplied to a motor, the output of the motor driving the mechanical plant;
   generating a voltage signal representative of the voltage level of the electrical motor drive signal;
   generating a current signal representative of the current of the electrical motor drive signal;
   generating a force signal representative of the force at the output of the motor;

generating an angular velocity signal representative of the velocity at the output of the motor;

generating a voltage/current feedback control signal from a predetermined ratio of the voltage and current signals;

generating a force/velocity feedback control signal from a predetermined ratio of the force and velocity signals;

combining the control signal, the voltage/current feedback control signal, and the force/velocity feedback control signal for controlling the generation of the electrical motor drive signal and for controlling the moving and holding of the mechanical plant.

13. The method of claim 12 comprising the further steps of generating a plant velocity signal representative of the velocity of the mechanical plant driven by the motor;

combining the control signal, the voltage/current feedback control signal, the force/velocity feedback control signal, and the plant velocity signal for controlling the generation of the electrical motor drive signal and for controlling the moving and holding of the mechanical plant.

14. The method of claim 13 comprising the further steps of generating a plant position signal representative of the position of the mechanical plant driven by the motor;

combining the control signal, the voltage/current feedback control signal, the force/velocity control signal, the plant velocity signal, and the plant position signal for controlling the generation of the electrical motor drive signal and for controlling the moving and holding of the mechanical plant.

15. A multiloop balanced bridge feedback control apparatus for use in a rotational pointing control system comprising:

a first summer having a command input, a feedback input, and an output, a control signal being provided to the command input of the first summer;

a first compensator having an input, an output, and a predetermined transfer function, the output of the first summer being provided to the input of the first compensator;

a second summer having a command input, a feedback input, and an output, the output of the first compensator being provided to the command input of the second summer;

a second compensator having an input, an output, and a predetermined transfer function, the output of the second summer being provided to the input of the second compensator;

a third summer having a command input, a feedback input, and an output, the output of the second compensator being provided to the command input of the third summer;

a third compensator having an input, an output, and a predetermined transfer function, the output of the third summer being provided to the input of the third compensator;

an amplifier having an input and an output, the output of the third compensator being provided to the input of the driver and the output of the amplifier providing an electrical signal responsive to the control signal;

a motor having an input and an output, the electrical signal output by the amplifier being provided to the input of the motor and the output being operatively connected to a mechanical plant to be rotated and exhibiting a torque and an angular velocity;

a first pair of collocated sensors for sensing the voltage and current levels of the electrical signal at the output of the amplifier and for producing voltage and current signals representative thereof;

a second pair of collocated sensors for sensing the torque and angular velocity at the output of the motor and for producing torque and angular velocity signals representative thereof;

a fourth compensator having an input and an output, the input of the fourth compensator being provided with one of the two signals produced by the first pair of collocated sensors;

a fourth summer having a first input, a second input, and an output, the output of the fourth compensator being provided to the first input, the signal produced by the first pair of collocated sensors but not provided to the fourth compensator being provided to the second input, and the output of the fourth summer being provided to the feedback input of the third compensator;

a fifth compensator having an input and an output, the input of the fifth compensator being provided with one of the two signals produced by the second pair of collocated sensors;

a fifth summer having a first input, a second input, and an output, the output of the fifth compensator being provided to the first input, the signal produced by the second pair of collocated sensors but not provided to the fifth compensator being provided to the second input, and the output of the fifth summer being provided to the feedback input of the second compensator, and an angular velocity sensor operatively connected to the mechanical plant and having an output providing a signal representative of the angular velocity of the mechanical plant, the output being provided to the feedback input of the first summer.

* * * * *